United States Patent
Misch et al.

(10) Patent No.: US 12,432,437 B2
(45) Date of Patent: Sep. 30, 2025

(54) METHOD AND SYSTEM FOR EVENT-BASED IMAGING

(71) Applicant: Carl Zeiss Microscopy GmbH, Jena (DE)

(72) Inventors: Nicola Verena Misch, Limburgerhof (DE); Ralf Flachmann, Limburgerhof (DE); Anne-Christina Herwig, Limburgerhof (DE); Christian Klukas, Limburgerhof (DE)

(73) Assignee: Carl Zeiss Microscopy GmbH, Jena (DE)

( * ) Notice: Subject to any disclaimer, the term of this patent is extended or adjusted under 35 U.S.C. 154(b) by 37 days.

(21) Appl. No.: 18/016,806

(22) PCT Filed: Jul. 21, 2021

(86) PCT No.: PCT/EP2021/070458
§ 371 (c)(1),
(2) Date: Jan. 18, 2023

(87) PCT Pub. No.: WO2022/018173
PCT Pub. Date: Jan. 27, 2022

(65) Prior Publication Data
US 2023/0291992 A1 Sep. 14, 2023

(30) Foreign Application Priority Data
Jul. 22, 2020 (EP) .................................... 20187285

(51) Int. Cl.
*H04N 23/61* (2023.01)
*G06V 20/69* (2022.01)

(52) U.S. Cl.
CPC ........... *H04N 23/61* (2023.01); *G06V 20/698* (2022.01)

(58) Field of Classification Search
CPC ... H04N 23/61; G06V 20/698; G06F 18/2413
(Continued)

(56) References Cited

U.S. PATENT DOCUMENTS

| | | | |
|---|---|---|---|
| 6,444,992 B1 | 9/2002 | Kauvar et al. | |
| 6,711,283 B1 * | 3/2004 | Soenksen | H04N 23/631 |
| | | | 382/128 |
| 6,724,419 B1 * | 4/2004 | Green | G02B 21/367 |
| | | | 348/79 |
| 6,844,965 B1 * | 1/2005 | Engelhardt | G02B 21/0036 |
| | | | 359/383 |

FOREIGN PATENT DOCUMENTS

| | | | |
|---|---|---|---|
| CN | 105319226 A * | 2/2016 | ......... C12N 15/1065 |
| JP | 7249999 B2 | 3/2023 | |
| WO | WO-2016/003936 A1 | 1/2016 | |
| WO | WO-2019/032723 A1 | 2/2019 | |

OTHER PUBLICATIONS

International Application No. PCT/EP2021/070458, International Search Report and Written Opinion, mailed Oct. 12, 2021.

*Primary Examiner* — John W Miller
*Assistant Examiner* — Omer Khalid
(74) *Attorney, Agent, or Firm* — MARSHALL, GERSTEIN & BORUN LLP (57) ABSTRACT

The present invention refers to a computer-implemented method for event-based imaging at least one specimen to record only structures of interest as events, the method comprising: providing an automated image capturing device coupled with a specimen holder, a controller coupled with the image capturing device, at least one processor in an operative conjunction with the controller, and a computer-readable medium comprising instructions that, when executed by the at least one processor, cause the controller and/or the at least one processor to: a) acquire (102), by the image capturing device, at least one initial image of the at least one specimen (100) carried by the specimen holder, b) search (103) the at least one initial image for structures of interest, using an image processing algorithm, C) upon detection of one or more structures of interest, control an (Continued)

imaging capturing software of the image capturing device to acquire (104) at least one main image of the detected structures of interest, respectively, d) classify (105) the detected structures of interest in the at least one main image, using a classifying algorithm, e) evaluate (106) the classified structures of interest, and f) output (107) a result of the evaluated structures of interest, executing the instructions by the at least one processor, wherein at least steps a) to c) are repeated until a pre-given number k of structures of interest has been detected, with k being an integer.

20 Claims, 3 Drawing Sheets

(58) Field of Classification Search
USPC .......................................................... 348/79
See application file for complete search history.

(56) References Cited

U.S. PATENT DOCUMENTS

| | | | |
|---|---|---|---|
| 9,684,960 B2* | 6/2017 | Buzaglo | G06V 10/764 |
| 9,810,894 B2* | 11/2017 | Grier | G01P 5/20 |
| 2001/0054692 A1* | 12/2001 | Nakada | H01J 37/28 |
| | | | 250/311 |
| 2012/0148141 A1* | 6/2012 | Ozcan | G01N 15/1434 |
| | | | 382/133 |
| 2013/0051672 A1 | 2/2013 | Robinson et al. | |
| 2015/0355443 A1* | 12/2015 | Okabe | G02B 21/367 |
| | | | 348/80 |
| 2016/0328635 A1 | 11/2016 | Dave et al. | |
| 2018/0136451 A1 | 5/2018 | Soenksen | |
| 2020/0410697 A1* | 12/2020 | Phelippeau | G06V 20/647 |
| 2022/0229862 A1* | 7/2022 | Kappel | G06N 3/08 |

* cited by examiner

METHOD AND SYSTEM FOR EVENT-BASED IMAGING

CROSS-REFERENCE TO RELATED APPLICATIONS

This is the U.S. national phase of International Application No. PCT/EP2021/070458, filed Jul. 21, 2021, which claims the benefit of European Patent Application No. 20187285.0, filed on Jul. 22, 2020.

FIELD OF THE INVENTION

The present invention refers to a method and a system for event-based imaging at least one specimen to record only structures of interest, thus, reducing both the volume of the data analysis and the volume of data storage thus increasing the throughput of a study.

BACKGROUND

Microscopical analysis is an essential tool in natural sciences. However, accurate and reliable data is only generated by analyzing large specimen volumes independently of human bias. This is currently beyond what can be achieved by limited human labour and manual, time consuming microscopy.

To circumvent these limitations, it is an object to further automate microscopical analysis. Automated imaging, efficient handling of large images down to both automation of structure classification and quantification would be desirable. Smart automation of microscopy would allow currently impossible high throughput analysis for complex 3D or 4D imaging tasks in an unbiased fashion with minimal human labour.

US 2001/0054692 A1 describes a scanning electron microscope (SEM) which can full-automatically search and classify objects and faults on a specimen, particularly a wafer, in the two-dimensional space by correcting two-dimensional object/defect coordinate information sent from an inspection system into optimum values by a computer according to information pertaining to the two-dimensional position of the specimen holder and information pertaining to the two-dimensional positions of objects or defects received from the inspection system and determining a searching magnification at which objects or defects are automatically detected from the corrected values. The described scanning electron microscope comprises a stage which can move horizontally with a specimen on it and a function which moves said stage horizontally to new coordinates which are obtained by correcting coordinate values of objects of interest on said specimen which were obtained by the inspection system by a coordinate correcting expression to observe said objects of interest, wherein said scanning electron microscope further comprises a function which calculates the accuracy of correction of said coordinate correcting expression according to said corrected coordinate values and actual coordinates at which the object was observed. In order to detect an object in a first surface element on the specimen, the SEM moves to the corresponding point (coordinates) in an adjoining second surface element on the specimen, gets a reference image, moves to the first surface element, gets a comparison image, compares these images, and thus identifies an object.

In a conventional microscopy study, a researcher defines an experimental configuration, typically a combination of time lapse, z-stack, multi-channel, multi-position, and multi-view settings. Essentially, the most a respective microscope will do is fully defined before a respective experiment is initiated.

Thus, it is an object of the present disclosure to provide a method and a system for an imaging analysis with an increased throughput and with a simultaneous automatic termination of the analysis if sufficient results are available.

SUMMARY OF THE INVENTION

The present disclosure refers to a computer-implemented method for event-based imaging at least one specimen to record only structures of interest as events, the method comprising:
providing an automated image capturing device coupled with a multi-specimen holder, a controller coupled with the image capturing device, at least one processor in an operative conjunction with the controller, and a computer-readable medium comprising instructions that, when executed by the at least one processor, cause the controller and/or the at least one processor to:
a) acquire, by the image capturing device, at least one initial image of the at least one specimen carried by the-specimen holder,
b) search the at least one initial image for structures of interest, using an image processing algorithm,
c) upon detection of one or more structures of interest, control an imaging capturing software of the image capturing device to acquire at least one main image of the detected structures of interest, respectively,
d) classify the detected structures of interest in the at least one main image, using a classifying algorithm, particularly a machine learning classifying algorithm,
e) evaluate the classified structures of interest, and
f) output a result of the evaluated structures of interest,
executing the instructions by the at least one processor, wherein at least steps a) to c) are repeated until a pre-given number k of structures of interest has been detected, with k being an integer greater than zero.

The proposed imaging approach that only acquires digital images of regions of interest and/or of structures of interest ("event-based imaging") will reduce the enormous number of unnecessary images (up to 90%) and thereby will increase the throughput dramatically. The workflow resulting when executing the proposed method will enable essential microscopical studies of e. g. plant pathosystems and/or soft matter-based systems. The proposed method allows to increase the throughput and provide statistical relevance of measurements of different cellular processes of biology.

Generally, as described for example in "Digital Images", Computer Sciences, Encyclopedia.com, 16.6.2021, https://www.encyclopedia.com, a digital image is not an image in the conventional sense, but a description of a real image as a set of numbers. The set of numbers can be stored, processed and visualized on a display unit, using a digital computing unit, such as the above mentioned controller and/or the above mentioned at least one processor. A digital image consists of a mosaic of small areas called pixels wherein for each pixel, the image capturing device records a number, or a small set of numbers, that describe some property of the respective pixel, such as its brightness (intensity of light) or its color. The recorded numbers are arranged in an array of rows and columns that correspond to the horizontal (x-) and vertical (y-) positions of the respective pixels in the digital image. A resolution of a digital image is expressed in the number of pixels per inch (ppi). A higher resolution results in a more detailed digital image.

The automated image capturing device may be an automated microscope, particularly an automated highspeed microscope, such as the ZEISS Axio Scan.Z1®. However, all kind of automated image capturing devices implemented and used in automated monitoring and/or control systems can be provided and used. The image capturing device is capturing the images as digital images or on the basis of digital images. The image capturing device may comprise an arrangement of different image capturing modules. It is possible that a first image capturing module is used to acquire the at least one initial image and a second image capturing module is used to acquire the at least one main image.

Event-based imaging is used as focused method for information-rich data for both semi- and fully automated highspeed image capturing, preferably with a digital automated highspeed microscope. Here, the image capturing device, preferably the microscope, is programmed to disregard information in the information-rich data with the exception of relevant features, called herein regions of interest and/or structures of interest. Event-based imaging can be applied to any experimental setup that requires microscopical analysis of small but specific regions of interest of a larger specimen. Event-based imaging is preferably embedded into a fully digital workflow from automated image acquisition down to automated structure classification and quantification. Thus, throughput can be dramatically increased and the costs of microscopical analysis can be reduced via operation of microscopes with significantly less to no user interaction. Additionally, more microscopic data-independent of human bias-lead to better statistical confidence.

In the event-based approach as proposed by the claimed subject matter of the present invention, detected events in terms of structures of interest and/or regions of interest are used to influence an experimental configuration, e.g. the experimental setup of the image capturing device and its operation conditions. In addition, its operation mode can also be set up. This is done with closed feedback loops where image analysis and/or search protocols are run on an image as it is acquired, e.g. on the at least one initial image. An initial image is an image of a specimen that is taken, using the image capturing device, in a first step when starting the event-based imaging for the respective specimen and the initial image serves as a starting image, which is subjected to a comparatively rough analysis, and on the basis of which it is decided whether and how further images, in particular at least one main image, will be taken. In relation to a surface area of the respective specimen, the initial image may be a continuous image of the respective specimen or an image composed of partial images as a result of stitching together partial images of the respective specimen or each such partial image of the respective specimen by itself may represent an initial image of the respective specimen. In relation to a height or thickness of the specimen, the initial image may be a three-dimensional image with a depth resolution, the three-dimensional image usually resulting from a superposition of a plurality of two-dimensional digital images, which are in the following also called source images. The results of the analysis and/or search on the initial image, for example, whether events are detected or not and/or the type(s) of the detected events, are used to decide what happens next. Such an approach has the potential to save a vast amount of time in microscopy, enabling larger scale studies, and a reduction in user error and bias. Such feedback loops are also more objective and unbiased than human operators.

Modern digital microscopes can acquire a large, perhaps unmanageable, number of digital images. In many studies only a fraction of these digital images contains the information that is searched for and which can be used to answer a specific question. An event-based approach can be used to extract regions of interest and/or structures of interest of an image as it is acquired, particularly of the at least one initial image, and dramatically reduce the data storage requirements of a study. Such structure of interest may be or comprise a specific pattern and/or a pattern that is conspicuous in relation to its surroundings. For example, if specific chemical or biological structures or patterns in the specimen are to be studied then only the regions of the at least one initial image containing the specific structures or patterns are saved for further analysis. For example, if specific modifications of biological material structures, e.g. of structures of an animal or plant tissue, organs or parts thereof, or of structures of, fungals or cell cultures, are to be studied using time-lapse microscopy then only the regions of the at least one initial image containing the specific structures are saved as regions of interest for further analysis. In light microscopy there is a constant trade-off between spatial resolution, frame rate, signal to noise ratio (SNR) and light exposure. When imaging live specimens a limited, ideally physiological, light exposure should be used to ensure the relevant biology is not affected by the imaging. Further, the specimen light exposure can be reduced by only imaging what is needed. This intelligent use of the light budget allows for a combination of higher SNR, spatial resolution, and frame rate with equivalent total light exposure.

Generally, an event-based imaging can be applied to specimens that comprise specific structures of interest and/or regions of interest that are separable from surrounding structures, patterns and/or regions. Specimens can be any material that can comprise such a structure of interest or region of interest. Such specimens can be, for example, samples of water, soil samples, e.g. soil samples with nanoplastic particles, or chemical compositions, like foam with trapped dust particles.

An analysis of events according to the invention relates for example to specimens that comprise regions of interest. The regions of interest are regions that comprise a structure or pattern that is different from a general or major structure or pattern of the sample or specimens comprising the region of interest that shall be identified or analyzed according to the method of the invention. Specimens with such a pattern or structure can be analyzed for modifications of the respective pattern or structure encompassed by the specimens. In one embodiment of the invention, the structure of interest or the region of interest is small, and can, for example, only be identified with a microscope as described herein.

Specimens to be analyzed according to the invention are, for example, solutions, compounds, mixtures and/or biological materials which comprise a region of interest or are expected to comprise a region of interest. For example, the specimen can be biological material, e.g. biological tissue, biological organ, cells, cell culture or one or more part thereof. Biological tissues or organs or parts thereof comprise plant- or animal-derived material. As described in the examples, the specimens that can be analyzed are, for example, material derived from plants tissues or organs like plant leaves, plant roots, flowers, seed, stems, or parts thereof. In one embodiment, the specimens analyzed are cells or microorganisms, for example cell cultures or mixtures of microorgansims.

Applications for event-based imaging with only small fractions of a respective specimen containing regions of interest could be the following examples: pathology of anatomic specimen (e.g. dye-stained and immune-stained dissections) and stereology thereof; detection of viral, bacterial or fungal infection and/or analysis; identification of type and class of an infection; bioassays, e.g. in medication screening, for example single cell tumor detection of various cancer diseases; medical diagnostic of various diseases via e.g. hematology; assays in cell biology, e.g. automated counting of locations with via e.g. fluorescently marked cells or biomolecules like marker-fusion-proteins; fluorescence-in-situ hybridisations; microarray of tissues; 3D reconstruction of regions of interests; timelapse course of biochemical or chemical reaction, e.g. the polymerization of actin to follow a development of the cell cytoskeleton or molecular motors; as well as the detection of stably or transiently transfected or transformed cells, e.g. plant cells, animal cells, microorganisms, such as bacteria, fungi, yeast or others, via, for example, fluorescent markers.

The method of the invention can, for example, be used to identify any change of a structure of interest or of a region of interest in a biological material as result of a biotic or abiotic stress, e.g. a chemical, environmental or biological stress, e.g. drought or nutrient deficiency. In the present application, abiotic stress refers generally to abiotic environmental conditions a plant is typically confronted with, including, but not limited to, drought (tolerance to drought may be achieved as a result of improved water use efficiency), heat, low temperatures and cold conditions (such as freezing and chilling conditions), salinity, osmotic stress, shade, high plant density, mechanical stress, oxidative stress, and the like. Biotic stresses refers to stresses as result of an infection, e.g. by pests and pathogens.

In a recent trend the acquisition software for many wide-field and confocal systems can perform simple event-based approaches. The acquisition software, herein also called imaging capturing software, is configured to be combined with external platforms, such as Fiji, Icy, CellProfiler or Matlab®, and enables the use of image analysis. Thus, a two-way bridge between the acquisition software and external analysis platforms can be realized. With such a setup a respective user is able to send a variety of acquisition commands to the acquisition software from the external platform and by using a thorough documentation the user is able to retrieve images.

The automated transfer of the specimen holder into a light beam of the image capturing device makes it possible to provide the image capturing device with multiple specimens either in one step or successively. The specimen holder can vary, e.g. from a classical glass slide to a multiwell plate. One type of specimen holder could have a capacity for a plurality of slides, e.g. for up to 4 slides, and each slide can host multiple specimens. The specimen holder can be taken from a specimen chamber. The specimen chamber may be a component of the image capturing device. The specimen chamber may have a capacity for a plurality of specimen holders, e.g. 2, 4, 6, 10, 20, 25 or more specimen holders. Alternatively, the specimen chamber is a separate component that can be accessed from outside. Such an access from outside can be performed, e.g., by a gripping device such as a robot arm. The gripping device may be configured to remove a specimen holder from the specimen chamber and/or to place the specimen holder in the specimen chamber. The gripping device may further be configured to place the specimen holder (and thus a specimen hosted by the specimen holder) correctly in/on/at the image capturing device, e.g. in a respective light beam of the image capturing device.

According to an embodiment of the proposed method, the instructions, when executed by the at least one processor, further cause the controller and/or the at least one processor to control such a gripping device, such as a robot arm to removes a specimen holder, and with that the at least one specimen, from the specimen chamber and/or to place the at least one specimen on the specimen holder into a light beam of the image capturing device and/or vice versa.

The specimen chamber may be a kind of silo which is configured to host a plurality of specimen holders of same or different type.

According to a further embodiment of the proposed method, as image processing algorithm a machine learning algorithm, particularly a deep learning algorithm is used for searching the at least one initial image for structures of interest. Such a machine learning algorithm is trained to automatically detect and identify structures of interest. The machine learning algorithm is trained by a user to automatically identify desired structures of interest, such as specific biological cell states, during an unattended, fast, (optionally low-resolution) prescanning mode, e.g. during the capturing of the at least one initial image. Upon identification of one or more structures of interest the method is continued in step c) by switching to a more complex imaging procedure, particularly to acquire at least one main image of the detected structures of interest, respectively. A main image is an image with a higher magnification compared to the initial image. In relation to a surface area of the respective specimen, the main image can be a continuous image or an image composed of a number of partial images. Furthermore, in relation to the height or thickness of the respective specimen, the main image has a depth resolution that is usually greater than that of the previously recorded initial image and is accordingly composed of a plurality of superimposed two-dimensional digital images, herein also called source images. Therefore, the imaging procedure for the main image generally has a higher complexity. After completion of the desired more complex imaging procedure, particularly after acquiring the at least one main image, it is returned to the prescanning mode to identify additional structures of interest, particularly steps a) to c) of the proposed method are repeated until a pre-given number k of structures of interest has been detected.

A complex imaging procedure has additional parameters like acquiring main images at higher magnification compared to the previously acquired initial images with different objective lenses, acquiring main images not only from the specimen surface but from multiple focal planes within the specimen, e.g. at multiple focal distances, acquiring main images over a defined timespan to monitor putative changes in the specimen, acquiring main images of mobile regions of interests which change their position during the observation period and/or acquiring main images in brightfield application prior to switching to fluorescence application with larger magnification and/or acquiring main images at low magnification for one fluorescence signal followed by acquiring main images for a second fluorescence signal at higher magnification and/or acquiring main images using an image capturing module of the image capturing device different from an image capturing module used to acquire the initial image, e.g. a multispectral camera.

Usually, such complex imaging procedure also coincides with larger data accumulation. The image processing algorithm may be a machine learning algorithm. The classifying algorithm may also be a machine learning algorithm.

The machine learning algorithms used herein may each be realized by at least one trained convolutional neural network (CNN). Each of the at least one trained CNN is implemented by collections of program routines being executed by the at least one processor. Such a trained CNN may have multiple layers. Each of the at least one trained CNN has at least an input layer and an output layer. It is possible that such a trained CNN has further (multiple) intermediate layers that are hidden, in which case the machine learning algorithm is regarded as a deep learning algorithm. CNNs are well known in the art. To search the at least one initial image for structures of interest using the at least one CNN as image processing algorithm, the at least one CNN must be trained. The at least one CNN, implemented and running on the at least one computer processor, is trained with provided digital images as input and associated annotated images as output wherein the at least one CNN is trained to correlate a respective input image with a respective associated annotated image. It is possible to train the at least one CNN to correlate every pixel in an input image with a respective label of a respective associated pixel-wise annotated image.

Explained by way of example for the case of fungal infection of a plant, the at least one CNN realizing the image processing algorithm is preferably trained to differentiate between fungal infection at a surface of a respective specimen of the plant versus progressed fungal infection in an epidermal layer plus a layer below the epidermis of the respective specimen of the plant. Therefore, partial images at different focal distances, for example at seven different focal distances with a respective spacing of about 50 μm are acquired. In each partial image fungal structures as structures of interest are annotated by drawing boxes which are as small as possible, and labelled with letters relevant for respective fungal structures. Both, clearly identified fungal structures and those which are likely to be fungal structures of a certain fungal growth status are annotated. For developing and training the image processing algorithm at least one focal distance is used. In a respective training database, it is possible to either only include images with annotated fungal structures, or to include both, images without annotated fungal structures and images with annotated fungal structures. Preferably, 0% to 10% of the images in the training database are images without annotated fungal structures.

The controller and/or the at least one processor are configured to read the at least one initial image via a communication channel, interrupt the scan, e.g. interrupt acquiring the at least one initial image to search it for structures of interest and, upon detection of one or more structures of interest, reconfigure the image capturing device for the desired complex imaging procedure, particularly the acquisition of the at least one main image.

The prerequisites for such an automatic imaging method are motorization of a used device stage, automatic changing of objectives and/or scanner zoom, and switching of fluorescence filters and/or laser lines. The image capturing device should also provide multipositioning and/or grid scanning along with autofocus capabilities. The image capturing device comprises at least one interface for allowing a remote control by the controller and/or the at least one processor. Any kind of suitable communication technology can be used to establish a communicative connection between the controller, the at least one processor and the image capturing device, respectively.

Alternatively, and/or additionally to the use of a machine learning algorithm for searching the at least one initial image for structures of interest, the image processing algorithm uses other phenomena. According to an embodiment of the proposed method, measurable characteristic visual contrasts, particularly measurable characteristic light phenomena, such as fluorescence, phosphorescence, reflectance, are used for searching the at least one initial image for structures of interest. Due to a respective known characteristic response of individual structures of interest to a specific controllable illumination with regard to the above-mentioned light phenomena, these structures of interest can be detected.

Considering a single specimen of the at least one specimen, according to one aspect of the present disclosure, the at least one initial image of the respective specimen is in fact one image of the entire specimen, alternatively, the at least one initial image is one image of a part of the specimen, also called image of a partial specimen. In the latter case, the one image of the part of the specimen is also designated as a partial image of the entire specimen. An initial image may also be an image composed of partial images.

In another aspect of the present disclosure, the at least one initial image of a respective specimen is acquired as a number of partial images of the respective specimen wherein the partial images of one or more specimens are searched, for each specimen as a whole or in succession, for structures of interest until the pre-defined number k of structures of interest has been detected. Thus, each such partial image of a respective specimen represents an initial image of the respective specimen. The number of the partial images can be any integer greater than zero. The partial images can be put together like a mosaic in order to image or display a larger part of the respective specimen, i.e. a partial specimen, or the entire specimen. The partial images can also be designated as tiles. One partial image can, for example, correspond to one tile. It is possible that one or more or all partial images of a specimen are searched. In one embodiment, it is possible that one or more or all partial images of a specimen are searched at once for structures of interest. Only after detection of structures of interest, the at least one main image is recorded and further analysed, usually multiple main images of the detected structures of interest are recorded and further analysed. Alternatively, the partial images of a specimen are searched successively for structures of interest and whenever a structure of interest is detected in one of the partial images, a more complex imaging procedure is executed, particularly the at least one main image is captured. After completion of the more complex imaging procedure, the controller loops back to the prescanning mode, particularly to step a) and b), continuing at the partial image, particularly at the specimen position, where it stopped for acquiring the at least one main image.

It is possible that each detection of a structure of interest in one of the partial images launches the acquisition of the at least one main image. Alternatively, it is also possible that several partial images are searched first for structures of interest before launching the more complex imaging procedure, particularly the acquisition of the at least one main image, for a respective list of the several partial images. After reading the respective partial images, each partial image is for example segmented and a feature set per structure of interest is extracted. For segmenting interesting structures, depending on the visual properties of the structure of interest, a color-filter may be used, or texture analysis and filtering can be performed. For complex structures also deep learning approaches for object detection (e.g. 'Faster R-CNN' [Ren, S., He, K., Girshick, R., & Sun, J. (2015). Faster r-cnn: Towards real-time object detection with region proposal networks. In Advances in neural information processing systems (pp. 91-99).]) or segmentation (e.g. 'Mask R-CNN' [He, K., Gkioxari, G., Dollár, P., & Girshick, R. (2017). Mask r-cnn. In Proceedings of the IEEE international conference on computer vision (pp. 2961-2969).]) may be used. The coordinates and size of the detected objects or the labelled image pixels define the regions of interest and/or the structures of interest. After a predefined time or a predefined number of acquired partial images, the at least one main image is acquired and afterwards the image capturing device is switched back to acquire further initial images, e.g. further partial images of the same or of another specimen. In step d) the detected structures of interest are classified, using a classifying algorithm, particularly a machine learning classifying algorithm and in the subsequent step e) the classified structures of interest are evaluated, e.g. quantified. For example, in step e), the respective number or quantity of detected structures of interest to be assigned to a respective classification, particularly to a respective class is determined and indicated.

In the exemplary case of fungal infection of a plant, the classifying algorithm is preferably developed and trained to differentiate between, for example, three stages of fungal infection after penetration of respective plant cells. Partial images at a plurality of different focal distances, for example at fifteen different focal distances with a respective spacing of about 30 µm to 35 µm are acquired. In each partial image fungal structures are annotated by drawing boxes around the respective structures of interest, the drawing boxes are consistently about, for example, 800×800 pixel without any size variation, and labelled with letters relevant for respective fungal structures. Preferably, only clearly identified fungal structures are annotated. For training the classifying algorithm, it is preferred not to use the complete partial images but only the drawing boxes which represent respective sections of the respective partial images. In a respective training database, it is preferable to only include sections of partial images with annotated fungal structures as correct hits. It is further preferable to assign incorrectly annotated sections of partial images with corresponding supposedly recognised fungal structures from the image processing algorithm to an extra class with false hits as background for the training of the classifying algorithm. Preferably, the background is further to be enriched with other sections of partial images which do not comprise any fungal structures. Thus, the background comprises negative examples as false hits for the training of the classifying algorithm. The training database comprises groups consisting of sections of partial images with correctly annotated fungal structures and a group designated as background comprising sections of partial images with wrongly annotated fungal structures or with no annotated fungal structures.

Within the scope of the present disclosure the term "classification" refers generally to a division of structures of interest into groups according to particular characteristics, more particularly into classes of related plants/plant diseases/fungal infections. Deep learning approaches generally transparently observe texture and color features. As an alternative, the particular characteristics of detected objects, particularly detected structures of interest, may be determined through texture analysis (e.g. 'Haralick Texture Features' [Haralick, R. M., Shanmugam, K., & Dinstein, I. H. (1973). Textural features for image classification. IEEE Transactions on systems, man, and cybernetics, (6), 610-621.]). The calculated texture features can then be grouped according to similarity using machine learning approaches such as 'self-organizing map' [Kohonen, T. (1990). The self-organizing map. Proceedings of the IEEE, 78 (9), 1464-1480.] or K-means clustering [MacQueen, J. (1967 June). Some methods for classification and analysis of multivariate observations. In Proceedings of the fifth Berkeley symposium on mathematical statistics and probability (Vol. 1, No. 14, pp. 281-297).]. The grouping may also be based on differences to known classes. In this case the classes of the detected regions of interest and/or the detected structures of interest are determined by comparing them with the characteristics of known object classes and finding the smallest difference to them.

According to a further embodiment of the proposed method, the partial images of the one or more specimens are searched for structures of interest until a predefined number m of structures of interest of a specific classification, particularly of a specific class, is detected and classified, with m being an integer greater than zero, and m≤k. For example, in the particular case of classes, the one or more specimens are searched for structures of interest characterised by specific characteristics/features of respective given classes $c_i$ with i being an integer greater than zero. Such a division into classes may be predefined and allows a clear classification of detected structures of interest. It may be an aim to search for structures of interest of one of those classes until a predefined number m is detected. Thus, the sum of the structures of interest to be detected in the one or more specimens for all the given classes $c_i$ is k: $\Sigma_{c_i} m = k$.

Each such class may be characterized by specific structures of interest, e.g. specific structures that differ from a control type or a wild type. Examples for biological structures of interest are structures that are formed by a chemical, environmental or biological stress on a material, or as a reaction on such a stress by the material itself. Preferably, the structures of interest that characterize said class allow an identification of the underlying stress event. For example, each such class may be characterized by a specific plant defense structure, for example resulting from specific visible or unvisible plant defense reactions, and/or specific fungal structures, or structures indicating an infection of the underlying biological material. For example, the structures of interest the class may be characterized by may be specific fungal life stages, and/or any other specific plant disease structures. Depending on a particular examination, all conceivable class divisions can be pre-defined for the examination in question.

According to still another embodiment of the proposed method, the one or more specimens and/or the respective partial images of the one or more specimens with a pre-defined number n of structures of interest, respectively, particularly with a pre-defined number n of structures of interest of a specific class, are identified, with n being an integer greater than zero, and n≤k, particularly with n≤m. The image acquisition and image analysis stop automatically for a respective specimen either when the respective whole specimen has been searched or when n structures of interest, particularly n structures of interest of the specific class have been detected and classified.

In one embodiment, each specimen can be searched and analysed until a certain number of structures of interest, especially a certain number of structures of interest of a certain class, have been detected. Then the system automatically moves on to the next specimen until a total of k structures of interest, possibly m structures of interest of any or of each class $c_i$ of a predefined number of classes with $\Sigma_{c_i} m = k$, are detected.

According to a further embodiment of the proposed method, the at least one initial image is acquired as a number of temporary partial images. Due to the acquisition of temporary partial images storage space can be saved, and the total throughput can be increased. The temporary partial images, also called tiles, are analysed in groups or one by one for one or more structures of interest and/or for different structures of interest.

In still a further aspect of the proposed method, the at least one initial image is acquired as a respective low magnification image. The acquisition of low magnification partial images, particularly the acquisition of temporary low magnification partial images further reduces a respective data flow and storage and allows a faster acquisition of the at least one initial image.

According to still a further embodiment of the proposed method, searching the at least one initial image in step b) already includes differentiating between different structures of interest so that the at least one main image is already acquired with a number of z-stacks adapted to the detected different structures of interest. For example, when the at least one initial image is acquired, different structures of interest, even if they probably belong to a same class, are distinguished according to their current appearance, e.g. due to their respective progression, e.g. disease progression, or how deeply they have currently penetrated into a biological material, e.g. an animal or plant tissue or within a cell culture, in particular in a plant, plant tissue or plant organ or a part thereof, like a plant leaf, root or seed. Depending on the respective different structures of interest, the number of z-stacks for the main image to be acquired subsequently is determined. If, for example, the structure of interest seems to penetrate several layers of a biological material, e.g. an animal or plant tissue or within a cell culture, in particular in a plant, plant tissue or plant organ or a part thereof, like a plant leaf, root or seed, a different number of z-stacks is chosen for the acquisition of the main image than if the structure of interest only appears on the surface of the respective biological material, e.g. the animal or plant tissue or within the cell culture, in particular in the plant, plant tissue or plant organ or the part thereof, like a plant leaf, root or seed. However, in both cases, the respective structure of interest may be assigned to a specific class, e.g. to a chemical, environmental or biological stress on a material, or to a reaction on such a stress by the material itself, in particular to a specific plant or animal disease or a specific fungus/fungal infestation etc.

According to a further aspect of the proposed method, the at least one initial image is acquired with a predetermined number a of z-stacks, the number a of z-stacks being predetermined depending on the respective specimen and/or the expected detectable structures of interest.

Z-stacks are generated by taking multiple source images at different focal distances, incrementally stepping along the z-axis, i.e. along the optical axis. The wording "image with a number of z-stacks" means that multiple source images are taken at different focal distances, i.e. taken in different focal planes within the specimen, and combined to provide the respective image as a composite (initial or main) image with a greater depth of field than any of the individual source images. Thereby, source images are two-dimensional digital images that are acquired at one z-position for a given xy-position. By superimposing a number of source images a three-dimensional image with a depth resolution depending on the number of source images is obtained. The resulting three-dimensional image may be an initial image or a main image. Generally an initial image of a specimen has a smaller depth resolution, and, thus, is composed of fewer source images than a main image of the respective specimen. Therefore, an initial image of a specimen is an image with a smaller number of z-stacks than a main image of the respective specimen. Thus, both, the initial image and the main image may be composed of multiple source images which have been taken at different focal distances. The number of z-stacks is equal to the number of the different focal distances and, therefore, indicates a depth of the respective (initial or main) image regarding three-dimensionality.

Z-stacking of images of a specimen allows the tracking of a three-dimensional dynamics in the specimen at high spatial resolution by, e.g. simultaneously, imaging different focal planes within the specimen and, thus, following a progression of regions of interest and/or structures of interest into a three-dimensional space which enables evaluations and/or conclusions which are impossible in a two-dimensional space only. This is required e.g. for equalizing surface irregularities when automatically imaging unequal specimens as e.g. leaf surfaces and/or to categorize fungal structures that differ in growth and/or structures and/or initiated plant defense reactions along the z-axis.

Accordingly, the present invention relates also to a computer-implemented method for event-based imaging at least one specimen to record only structures of interest as events, the method comprising:

providing an automated image capturing device coupled with a specimen holder, a controller coupled with the image capturing device, at least one processor in an operative conjunction with the controller, and a computer-readable medium comprising instructions that, when executed by the at least one processor, cause the controller and/or the at least one processor to:

a) acquire, by the image capturing device, at least one initial image of the at least one specimen carried by the specimen holder, b) search the at least one initial image for structures of interest, using an image processing algorithm, c) upon detection of one or more structures of interest, control an imaging capturing software of the image capturing device to acquire at least one main image of the detected structures of interest, respectively, the at least one main image being a three-dimensional image, d) classify the detected structures of interest in the at least one main image, using a classifying algorithm, e) evaluate the classified structures of interest, and f) output a result of the evaluated structures of interest, g) execute the instructions by the at least one processor, wherein at least steps a) to c) are repeated until a pre-given number k of structures of interest has been detected, with k being an integer.

Further, in the case that no structures of interest are detected in a first initial image of a specimen with a first number of z-stacks, the image capturing device may be controlled to acquire a next initial image with a next higher number of z-stacks and/or to move, for acquiring the next initial image, to another location of the respective specimen or to another specimen of the at least one specimen. Thus, the number of z-stacks for the at least one initial image must not be predefined, but it can rather be modified and adapted during operation, particularly during the image acquisition process of the at least one initial image.

In the case that structures of interest are detected in at least one of the at least one initial image, the at least one main image of the detected structures of interest is acquired as a high magnification image in a further embodiment of the proposed method.

According to a further embodiment of the proposed method, in the case that structures of interest are detected in at least one of the at least one initial image, the at least one main image of the detected structures of interest is acquired as an image with a variable number of z-stacks, wherein the acquisition and the classification of the detected structures of interest are executed simultaneously so that the number of z-stacks of the at least one main image is chosen depending on the respective classification of the detected structures of interest, particularly on the respective class of the detected structures of interest. Generally, the at least one main image is acquired as a respective 3D image (three-dimensional image) or high magnification image at the same time classification by the machine learning classifying algorithm is done. The number of z-stacks depends on the classification, e.g. on the class the detected structures of interest are assigned to. Upon acquisition of the at least one main image the at least one main image is transferred for evaluation to a respective evaluation module, evaluation software and/or evaluation algorithm and a respective result of the evaluated structures of interest is outputted via a suitable output device such as a display, an audio output or any combination thereof. The type of classification, e.g. an assignment to predefined classes, can be learned in advance depending on the objective or focus of the underlying investigation, particularly the machine learning classifying algorithm is trained accordingly. The machine learning classifying algorithm may also be realized by at least one trained convolutional neural network (CNN). Each of the at least one trained CNN is implemented by collections of program routines being executed by the at least one processor. Such a trained CNN may have multiple layers. Each of the at least one trained CNN has at least an input layer and an output layer. It is possible that such a trained CNN has further (multiple) intermediate layers that are hidden, in which case the respective machine learning algorithm is regarded as a deep learning algorithm. CNNs are well known in the art. To classify the detected structures of interest in the at least one main image using the at least one CNN, the at least one CNN must be trained accordingly. The at least one CNN, implemented and running on the at least one computer processor, is trained with provided digital images as input and associated annotated images as output wherein the at least one CNN is trained to correlate a respective input image with a respective associated annotated image. It is possible to train the at least one CNN to correlate every pixel in an input image with a respective classification label of a respective associated pixel-wise annotated image.

Generally, the steps a) to c) are performed successively for the respective initial images of the at least one initial image. It is possible that the steps a) to d) are executed for one specimen and/or for different specimens until the predetermined number k of structures of interest has been detected, before steps e) and f) are executed.

According to a further embodiment, the steps a) to d) are executed for one specimen and/or for different specimens until the predetermined number of structures of interest has been detected, the detected structures of interest meeting the features of a specific classification, e.g. either according to a membership of a specific class or according to a different appearance within one and the same class.

The present disclosure also refers to a system for event-based imaging at least one specimen to record only structures of interest as events, the system comprising at least:
an automated image capturing device connected to a specimen holder,
a controller which is configured to be coupled with the image capturing device,
at least one processor in an operative conjunction with the controller,
a computer-readable medium comprising instructions that when executed by the at least one processor, cause the controller coupled with the image capturing device and/or cause the at least one processor to:
a) acquire, by the image capturing, at least one initial image of the at least one specimen carried by the specimen holder,
b) search the at least one initial image for structures of interest, using an image processing algorithm,
c) upon detection of one or more structures of interest, control an imaging capturing software of the image capturing device to acquire at least one main image of the detected structures of interest, respectively,
d) classify the detected structures of interest in the at least one main image, using a classifying algorithm, particularly a machine learning classifying algorithm,
e) evaluate the classified structures of interest, and
f) output a result of the evaluated structures of interest, wherein the processor is configured to execute the instructions such that at least steps a) to c) are repeated until a pre-given number k of structures of interest has been detected, with k being an integer greater than zero.

In a preferred embodiment of the proposed system, the instructions that when executed by the at least one processor, further cause the controller coupled with the image capturing device and/or cause the at least one processor to control a gripping device, particularly a robot arm to place the at least one specimen on the specimen holder and vice versa. The gripping device may further be configured to remove a specimen from a specimen chamber and/or to place a specimen in the specimen chamber.

In still a further preferred embodiment, the system comprises an output device that is configured to output the result to a user and that is one of the group comprising at least: acoustic device, haptic device, display device and any combination thereof.

In a further embodiment, the system comprises the above-mentioned gripping device which is configured to be controlled by the at least one processor and/or the controller to place the at least one specimen on the specimen holder and vice versa.

In another embodiment, the system also comprises a specimen chamber which is configured to be coupled with the image capturing device and designed to accommodate the at least one specimen before and/or after the at least one specimen is placed on the specimen holder and is made available to the image capturing device.

A further aspect of the present invention is a non-transitory computer-readable medium comprising instructions that when executed by at least one processor which is in operative conjunction with a controller of an automated image capturing device, cause the controller and/or the at least one processor to:
A) place at least one specimen on a specimen holder connected to the image capturing device,
B) acquire, by the image capturing device, at least one initial image of the at least one specimen,
C) search the at least one initial image for structures of interest, using an image processing algorithm,
D) upon detection of one or more structures of interest, control an imaging capturing software of the image capturing device to acquire at least one main image of the detected structures of interest, respectively,
E) classify the detected structures of interest in the at least one main image, using a classifying algorithm, particularly a machine learning classifying algorithm, F) evaluate the classified structures of interest, and G) output a result of the evaluated structures of interest, H) repeat at least steps B) to D) until a pre-given number k of structures of interest has been detected, with k being an integer greater than zero.

The computer-readable medium suitable for storing the instructions and data include all forms of non-volatile memory and memory devices, including, for example, semiconductor memory devices, e.g. flash memory devices, erasable programmable read-only memory (EPROM), electrically-erasable programmable read-only memory (EEPROM); magnetic disks, such as internal hard disks or removable disks; magneto-optical disks; optical disks; CD-ROM, DVD-R, DVD+R, DVD-RAM, and DVD-ROM disks or a combination of one or more of them. Such a memory device may store various objects or data, including caches, classes, applications, backup data, database tables, repositories storing dynamic information, and any other appropriate information including any parameters, variables, algorithms, instructions, rules, constraints, and/or references thereto. Additionally, the memory may include any other appropriate data, such as policies, logs, security, or access data, reporting files, as well as others. The at least one processor and the memory can be supplemented by, or incorporated in, special purpose logic circuitry.

The instructions can exist as a computer program, a software application, a software module, a script, or a code. The instructions can be written in any form of programming language, including compiled or interpreted languages, or declarative or procedural languages. Furthermore, the instructions can be deployed in any form, including as a stand-alone computer program or as a module, component, subroutine, or other unit suitable for use in a computing environment. In one embodiment, the computer-executable instructions of the present disclosure are written in HTML, TS (TypeScript), or CSS (Cascading Style Sheets).

A computer program may, but need not, correspond to a file in a respective file system. A computer program can be stored in a portion of a file that holds other computer programs or data, e.g., one or more scripts stored in a markup language document, in a single file dedicated to the computer program in question, or in a plurality of coordinated files, e.g., files that store one or more modules, sub-programs, or portions of code. A computer program can be deployed to be executed on one computer or on a plurality of computers that are located at one site or distributed across a plurality of sites and interconnected by a communication network. While portions of the computer program may be designed as individual modules that implement various features and functionality through various objects, methods, or other processes, the computer program may instead include a number of sub-modules, third-party services, components, and/or libraries, as appropriate. Conversely, the features and functionality of various components can be combined into single components as appropriate.

The at least one processor, particularly systems suitable for the execution of the method of the present disclosure can be based on general or special purpose microprocessors, or any other kind of CPU. Generally, a CPU will receive instructions and data from a read-only memory (ROM) or a random-access memory (RAM) or both. Besides the image capturing device and the controller, essential elements of the system, are a CPU (as the at least one processor) for performing or executing the instructions and one or more memory devices for storing the instructions and data. Generally, the system includes, or is operatively coupled to at least one memory device and is configured to receive data from or transfer data to, or both, the at least one memory device for storing data. The at least one memory device comprises, e.g., magnetic disks, magneto-optical disks, or optical disks. However, the system itself need not have such memory devices. Moreover, the system can be embedded in another device, e.g., a mobile telephone, a personal digital assistant (PDA), or a portable storage device, e.g., a universal serial bus (USB) flash drive, to name just a few.

The present description is presented and provided in the context of one or more particular implementations. Various modifications to disclosed implementations will be readily apparent to a person skilled in the art, and general principles defined herein may be applied to other implementations and applications without departing from the scope of the disclosure.

Implementations of the subject matter and the functional operations described in the present description can be implemented in digital electronic circuitry, in computer software, in computer hardware, including the structures disclosed in this description and their structural equivalents, or in combinations of one or more of them. Implementations of the subject matter described in this description can be implemented as one or more computer programs, e.g., one or more modules of computer program instructions encoded on a tangible, non-transitory computer-readable medium for execution by the at least one processor to control the operation of the image capturing device. Alternatively or in addition, the computer program instructions can be encoded on an artificially-generated propagated signal, e.g., a machine-generated electrical, optical, or electromagnetic signal that is generated to encode information for transmission to a suitable receiver device for execution by the at least one processor.

The automation of the image capturing process as described herein offers the following advantages:

time saving: after defining a respective experiment and image analysis parameters, experiments can run automatically without a need for a human operator, structures of interest are selected by a computer algorithm, this results in more consistent data than a subjective and biased selection by a human operator, the image capturing device could theoretically run far more specimens and the respective throughput is increased, the integrated feedback-loops for automated image analysis and acquisition as used in the proposed method described herein allow for a fast and efficient evaluation of available specimens with simultaneous saving of necessary data streams and data storage and thus of costs.

The used controller and the instructions provided by the proposed computer-readable medium allow defining specific imaging patterns and imaging jobs for the image capturing device. The image capturing device can also be controlled, and feedback loops can be implemented using respective interfaces of the image capturing device.

The image capturing device is fully automated, particularly all functions that are to be changed during screening and image acquisition, such as specimen position, laser and/or diode and/or lamp parameters, environment parameters of a respective specimen, are changed via a software tool. Further, there is provided a communication channel, particularly a communicative connection between the controller of the image capturing device and the at least one processor so that the method and its integrated feedback loops can be implemented.

Generally, the at least the image capturing device, the controller and the at least one processor are networked among each other via respective communicative connections. Each of the communicative connections between the different components may be a direct connection or an indirect connection, respectively. Each communicative connection may be a wired or a wireless connection. Each suitable communication technology may be used. The image capturing device, the controller and the at least one processor, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication. The terms "communicative connection" and "operative conjunction" are used synonymously herein.

The classifying algorithm, particularly the machine learning classifying algorithm, the image processing algorithm, particularly the machine learning searching algorithm, and the image evaluation algorithm can be run on the same or on different processors, respectively. The image capturing device control software may be run on a different processor than the one or more the above-mentioned algorithms run on. Large image batches can also be distributed to several processors for parallel processing. The terms "processor", "computer" and "computing device" are used synonymously herein.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

FIG. 2 shows in FIGS. 2a, 2b, 2c and 2d respective initial images of different fungal life stages and plant defense reactions captured by an automated microscope as usable in an embodiment of the proposed method and/or as component of the proposed system.

DETAILED DESCRIPTION OF THE DRAWINGS

Figure 1:
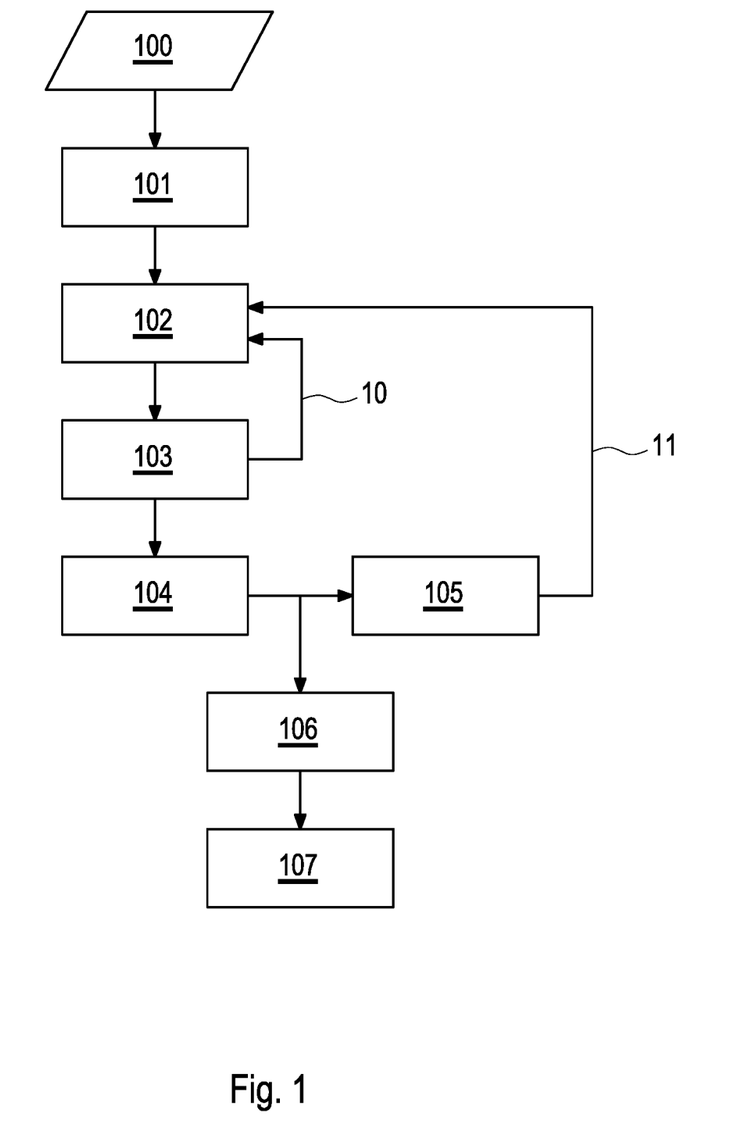
FIG. 1 schematically illustrates a flow diagram of an embodiment of the proposed method.

FIG. 1 shows a flow diagram of an embodiment of the proposed method for event-based imaging a specimen 100 and for recording only structures of interest. First, an automated image capturing device, not shown here, is provided which is to be coupled and/or which is coupled with an automatic transfer of specimen holder. In the present embodiment, the image capturing device is an automated highspeed microscope. The specimen-holder carries the specimen 100 and allows the specimen 100 to be made available in step 101 to the image capturing device for imaging if it is placed correctly. Further, a controller is coupled with the image capturing device and configured to control an operation of the image capturing device. At least one processor is in operative conjunction with the controller. Further, a computer-readable medium is provided that stores program codes, particularly instructions that are executable by the at least one processor immediately or after having been installed therein. The instructions, when executed by the at least one processor, cause the controller and/or the at least one processor to acquire in step 102 from the microscope, according to a first aspect, successively a number of low magnification partial images of a leaf surface as initial images. Such acquisition can be performed with an objective lens with five or tenfold magnification.

In step 103, according to the order in which the partial images are obtained, an image of the number of partial images is searched for structures of interest immediately after taking the image before the next image is captured. In the embodiment described here, a machine learning algorithm is used as image processing algorithm for searching. In the easiest case, the image processing algorithm is trained to detect any deviation from a normal appearance of the specimen. The image processing algorithm may also be trained to detect specific pre-defined structures of interest and/or to differentiate structures of interest without being able to typify them. Alternatively, and/or additionally other detectable phenomena can be used for searching, such as fluorescence, phosphorescence, reflection etc.

In the case that no structures of interest are found, an imaging capturing software of the microscope is controlled to move to a next partial image of the number of partial images, particularly the process goes back to step 102, as indicated by arrow 10, to take/capture/acquire the next partial image of the number of partial images.

Upon detection of one or more structures of interest, the imaging capturing software of the microscope is controlled to acquire in step 104 at least one main image of the detected structures of interest, respectively. The at least one main image can be a high magnification image, particularly a 3D high magnification image.

The at least one main image of the detected structures of interest is acquired as an image with a variable number of z-stacks, wherein the acquisition of the at least one main image in step 104 and the classification of the detected structures of interest in step 105 are executed simultaneously so that the number of z-stacks of the at least one main image is chosen depending on the respective class of the detected structures of interest. Generally, the at least one main image is acquired as a 3D image, particularly as a 3D high magnification image at the same time classification by the classifying algorithm, particularly by the machine learning classifying algorithm is done. The number of z-stacks, particularly the number of image layers, depends on the class and/or the classification. Different classes distinguish different types of structures of interest, e.g. the affiliation to respective types of plant diseases and/or fungal infection. Different classifications generally distinguish different forms of appearance of the same type or of different types of structures of interest. One and the same type of structure of interest can show different forms of appearance, for example, in a progressive development process. For the acquisition of the at least one main image, an objective lens with, for example, a ten- or twentyfold magnification is used. Up to, e.g., 17 z stacks can be captured. Due to the flexible number of image layers dependent on the detected class and/or classification, less storage is required. Thus, the whole process can be accelerated.

Upon acquisition of the at least one main image the at least one main image is transferred in step 106 for evaluation to a respective evaluation module, also called evaluation software or evaluation algorithm, and a respective result of the evaluated structures of interest is outputted in step 107 via a suitable output device such as a display, an audio output or any combination thereof.

The process is switched back to step 102 and steps 102 to 105 are repeated until a pre-determined number of structures of interest has been detected, wherein the detected structures of interest meet the features of a specific classification, particularly of a specific class, respectively.

It is possible that the steps 102 to 105 are repeated for one specimen and/or for different specimens, as indicated by arrow 11, until the pre-determined number of structures of interest has been detected, before steps 106 and 107 are executed.

The multi-specimen holder may be loaded with up to, e.g., 100 specimens. Thus, the multi-specimen holder can provide the microscope with up to 100 specimens at one time.

In the above described embodiment, there is no or only minor human interaction within imaging and evaluation. Imaging and analysis stop automatically after the classification of the pregiven number of structures of interest. Alternatively, imaging and analysis is stopped by a human user. Only information-rich data are handled and stored.

Alternatively, it is also possible that the at least one main image of the detected structures of interest is acquired in step 104 as an image with a static number of z-stacks, wherein the acquisition of the at least one main image in step 104 is executed before the classification of the detected structures of interest in step 105 is executed.

Further alternatively, the microscope acquires no temporary partial images, but a respective pre-scan of a respective specimen as initial image.

Figure 2:
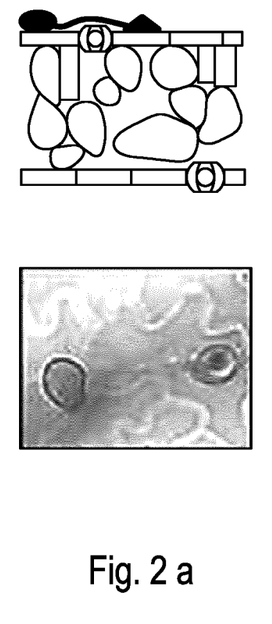

FIG. 2 shows in FIGS. 2a, 2b, 2c and 2d respective initial images of different fungal life stages and plant defense reactions captured by an automated microscope as usable in a further embodiment of the proposed method and/or as component of the proposed system. FIGS. 2a and 2b each show in a lower area real partial images of a plant leaf surface, whereby a structure of interest deviating from the rest of the surface can be recognized/detected. In a respective upper area schematic cross sections through the corresponding plant leaf are shown. It is recognizable that in both cases, the fungal infection, causing the respective structures of interest, is on the surface of the plant leaf and epidermal cell layer. Thus, it is not necessary to capture a further initial image with a higher number of z-stacks, and/or a main image with a high number of z-stacks. It is possible to control the imaging capturing software of the microscope to acquire a main image of the detected structures of interest, e.g. a 3D image, particularly a 3D high magnification image, with an adapted number of z-stacks.

The FIGS. 2c and 2d each also show, in a lower area, real partial images of a plant leaf surface, whereby a structure deviating from the rest of the surface can be recognized. In an upper area schematic cross sections through the corresponding plant leaf are shown. It is recognizable that in both cases, the fungal infection, causing the respective structures of interest, is penetrated deeper into the leaf interior. Thus, it is necessary to capture a further initial image with a higher number of z-stacks, and/or a main image with a sufficiently high number of z-stacks. Again, the imaging capturing software of the microscope is controlled to acquire a main image of the detected structures of interest, e.g. a 3D, high magnification image, with an adapted number of z-stacks.

Figure 3:
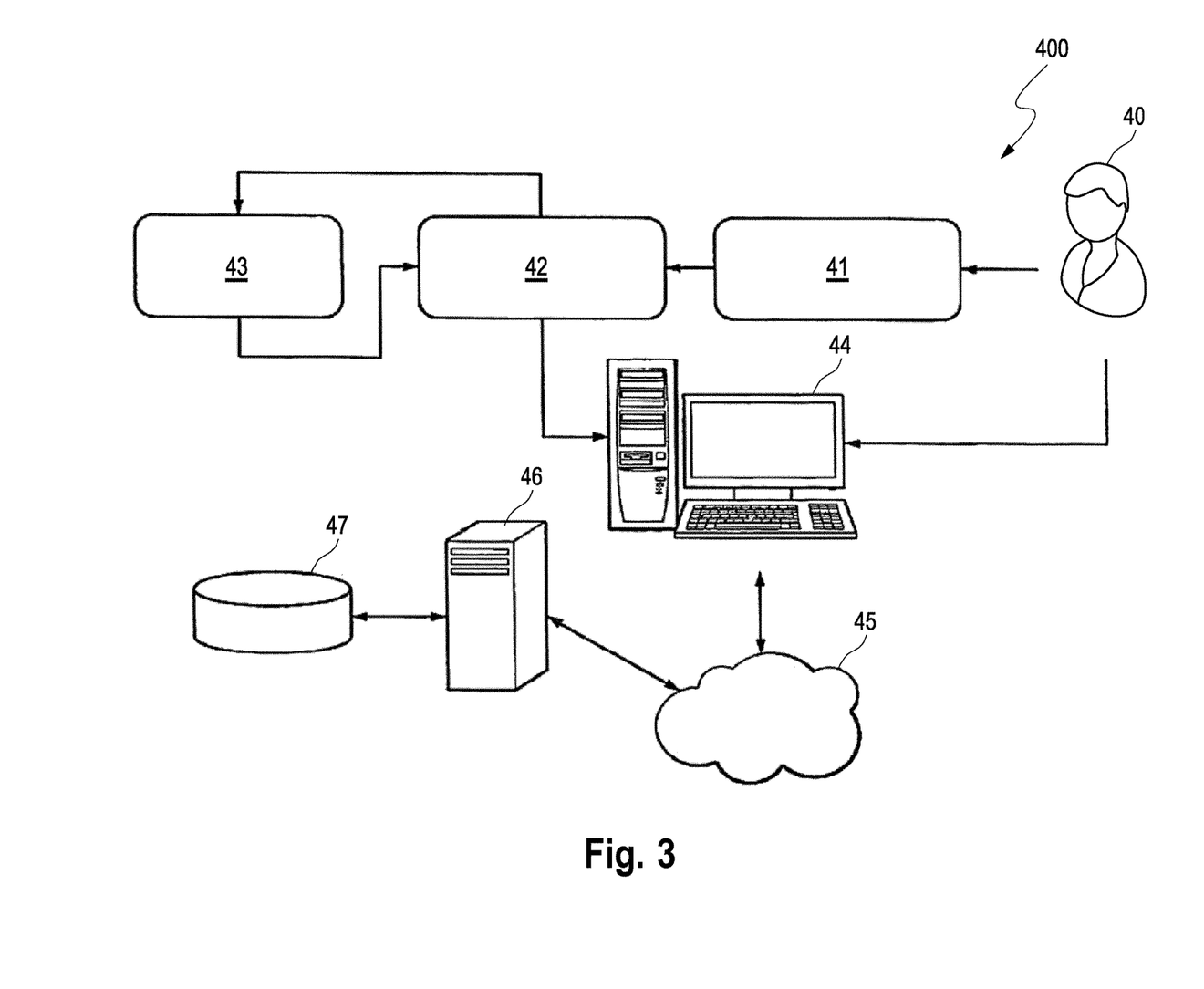
FIG. 3 schematically illustrates an embodiment of the proposed system.

FIG. 3 illustrates an embodiment of a system 400 which may be used to execute a method as described herein. A user 40 may utilize a user interface, such as a graphical user interface, of a controller 41 to operate at least one image capturing device 42 to capture digital images of at least one specimen 43.

The data from the image capturing device, e. g a microscope 42 may be transferred to a computer 44, such as a personal computer, a mobile device, or any type of processor. The computer 44 may be in communication, i. e. in a communicative connection, via a network 45, with a server 46. The network 45 may be any type of network, such as the Internet, a local area network, an intranet, or a wireless network. The server 46 is in communication with a database 47 that may store the data and information that are used by the methods of embodiments of the present invention for evaluation purposes. In various embodiments, the database 47 may be utilized in, for example, a client server environment or in, for example, a web-based environment such as a cloud computing environment. Various steps of the methods of embodiments of the present invention may be performed by the computer 44 and/or the server 46 in operative conjunction with the controller 41. In another aspect, the invention may be implemented as a non-transitory computer-readable medium containing instructions for being executed by at least one processor, e.g. the computer 44 and causing the at least one processor and/or the controller 41 in operative conjunction with the at least one processor to perform the method described above. The instructions can include various modules that are used to enable the at least one processor and a user interface to perform the methods described herein.

LIST OF REFERENCE SIGNS 100 specimen
101 method step
102 method step
103 method step
104 method step
105 method step
106 method step
107 method step
10 arrow
11 arrow
400 system
40 user
41 controller
42 image capturing device
43 specimen
44 computer
45 network
46 server
47 database

The invention claimed is:

1. A computer-implemented method for event-based imaging multiple specimens to record only structures of interest as events, the method comprising:
providing an automated image capturing device providing a light beam and a specimen holder carrying the multiple specimens, a controller coupled with the image capturing device, at least one processor in an operative conjunction with the controller, and a computer-readable medium comprising instructions that, when executed by the at least one processor, cause the controller and/or the at least one processor to:

a) place one of the multiple specimens into the light beam,
b) acquire, by the image capturing device, at least one initial image of the specimen placed in the light beam using an objective lens,
c) search the at least one initial image for structures of interest, using an image processing algorithm,
d) upon detection of one or more structures of interest, control an imaging capturing software of the image capturing device to acquire at least one main image of the detected structures of interest, respectively, using a different objective lens than for the at least one initial image, the at least one main image being a three-dimensional image of multiple focal planes within the specimen placed in the light beam,
e) classify the detected structures of interest in the at least one main image in a three-dimensional space, using a classifying algorithm,
f) repeat steps a) to e) for at least one different specimen of the multiple specimens,
g) evaluate the classified structures of interest, and
h) output a result of the evaluated structures of interest, and
executing the instructions by the at least one processor.

2. The method according to claim 1, wherein the at least one initial image of a specimen is acquired as a number of partial images of the respective specimen wherein the partial images of one or more specimens are searched, for each specimen as a whole or partial images of the specimen successively, for structures of interest until a pre-defined number k of structures of interest has been detected.

3. The method according to claim 2, wherein the partial images of the one or more specimens are searched for structures of interest of a specific classification until a predefined number m of structures of interest of the specific classification is detected, with m being an integer, and m≤k.

4. The method according to claim 1, wherein the at least one initial image is acquired as a number of temporary partial images.

5. The method according to claim 1, wherein each of the at least one initial image is acquired as a respective low magnification image.

6. The method according to claim 1, wherein searching the at least one initial image also includes differentiating between different structures of interest so that the at least one main image is already acquired by taking multiple source images at a number of different focal distances adapted to the detected different structures of interest.

7. The method according to claim 1, wherein the at least one initial image is acquired by taking multiple source images at a predetermined number a of different focal distances, the number a being predetermined depending on the respective specimen and/or expected detectable structures of interest.

8. The method according to claim 7 wherein, in the case that no structures of interest are detected in a first initial image of a specimen which is composed of multiple source images taken at a first number of different focal distances, the image capturing device is controlled to acquire a next initial image by taking multiple source images at a next higher number of different focal distances and/or to move, for acquiring the next initial image, to another location of the respective specimen or to another specimen of the specimen placed into the light beam.

9. The method according to claim 1, wherein, in the case that structures of interest are detected in at least one of the at least one initial image, the at least one main image of the detected structures of interest is acquired as a high magnification image, respectively.

10. The method according to claim 1, wherein in the case that structures of interest are detected in at least one of the at least one initial image, each of the at least one main image of the detected structures of interest is acquired as an image by taking multiple source images at a variable number of different focal distances, wherein the acquisition of the respective image and the classification of the detected structures of interest are executed simultaneously so that the number of different focal distances of each of the at least one main image is chosen depending on a respective classification of the detected structures of interest.

11. The method according to claim 1, wherein the steps a) to e) are executed for one specimen and/or for different specimens until a predetermined number of structures of interest has been detected, before steps f) and g) are executed.

12. A system for event-based imaging multiple specimens to record only structures of interest as events, the system comprising at least:
an automated image capturing device providing a light beam and a specimen holder carrying the multiple specimens,
a controller which is configured to be coupled with the image capturing device,
at least one processor in an operative conjunction with the controller, and
a computer-readable medium comprising instructions that when executed by the at least one processor, cause the controller coupled with the image capturing device and/or the at least one processor to:
a) place one of the multiple specimens into the light beam,
b) acquire, by the image capturing device, at least one initial image of the specimen placed in the light beam using an objective lens,
c) search the at least one initial image for structures of interest, using an image processing algorithm,
d) upon detection of one or more structures of interest, control an imaging capturing software of the image capturing device to acquire at least one main image of the detected structures of interest, respectively, using a different objective lens than for the at least one initial image, the at least one main image being a three-dimensional image of multiple focal planes within the specimen placed in the light beam,
e) classify the detected structures of interest in the at least one main image in a three-dimensional space, using a classifying algorithm,
f) repeat steps a) to e) for at least one different specimen of the multiple specimens,
g) evaluate the classified structures of interest, and
h) output a result of the evaluated structures of interest,
wherein the at least one processor is configured to execute the instructions.

13. The system according to claim 12, wherein the instructions that when executed by the at least one processor, further cause the controller coupled with the image capturing device and/or the at least one processor to control a gripping device, particularly a robot arm to place the specimen on a specimen holder into a light beam of the image capturing device.

14. The system according to claim 12 further comprising an output device that is configured to output the result to a user or a gripping device which is configured to be controlled by the at least one processor or the controller to place the specimen on the specimen holder into a light beam of the image capturing device or a multi-slide chamber which is configured to be coupled with the image capturing device and designed to accommodate the specimen before or after the specimen on the specimen holder is placed into a light beam of the image capturing device and made available to the image capturing device.

15. A non-transitory computer-readable medium comprising instructions that when executed by at least one processor which is in operative conjunction with a controller of an automated image capturing device providing a light beam, cause the controller and/or the at least one processor to:
  A) transfer multiple specimens on a specimen holder to the image capturing device,
  B) place one of the multiple specimens into the light beam,
  C) acquire, by the image capturing device at least one initial image of the specimen placed in the light beam using an objective lens,
  D) search the at least one initial image for structures of interest, using an image processing algorithm,
  E) upon detection of one or more structures of interest, control an imaging capturing software of the image capturing device to acquire at least one main image of the detected structures of interest, respectively, using a different objective lens than for the at least one initial image, the at least one main image being a three-dimensional image of multiple focal planes within the specimen placed in the light beam,
  F) classify the detected structures of interest in the at least one main image in a three-dimensional space, using a classifying algorithm,
  G) repeat steps B)-F) for at least one different specimen of the multiple specimens,
  H) evaluate the classified structures of interest, and
  I) output a result of the evaluated structures of interest.

16. The method according to claim 1, wherein after step d) the image capturing device is controlled to move, for acquiring a further initial image of another specimen, to the another specimen, and steps a) to d) are repeated for the another specimen.

17. The method according to claim 1, wherein at least steps b) to d) are repeated until a pre-given number k of structures of interest has been detected, with k being an integer.

18. The system according to claim 12, further comprising a specimen chamber having capacity for a plurality of specimen holders.

19. The system according to claim 12, wherein the at least one main image has a higher magnification than the at least one initial image.

20. The system according to claim 12, further comprising a machine learning algorithm configured to search the at least one initial image for structures of interest.

* * * * *